United States Patent [19]

Smith

[11] Patent Number: 4,479,776

[45] Date of Patent: Oct. 30, 1984

[54] THERMAL TREATMENT OF FOOD PRODUCTS

[76] Inventor: Donald P. Smith, P.O. Box 340530, Dallas, Tex. 75234

[21] Appl. No.: 341,640

[22] Filed: Jan. 22, 1982

Related U.S. Application Data

[63] Continuation-in-part of Ser. No. 286,060, Jul. 22, 1981, Pat. No. 4,409,453.

[51] Int. Cl.³ .............................................. F27B 9/00
[52] U.S. Cl. .................................. 432/144; 99/443 C
[58] Field of Search .......................... 432/11, 12, 144; 426/520; 99/355, 443 C, 447

[56] References Cited

U.S. PATENT DOCUMENTS

| 1,992,398 | 2/1935 | Ryder | 99/443 C |
| 3,884,213 | 5/1975 | Smith | 34/225 |
| 3,908,533 | 9/1975 | Fagerstrom et al. | 99/443 C |
| 4,132,216 | 1/1979 | Guibert | 99/443 C |
| 4,154,861 | 5/1979 | Smith | 426/520 |

FOREIGN PATENT DOCUMENTS

49-129241 12/1974 Japan .

*Primary Examiner*—John J. Camby
*Attorney, Agent, or Firm*—Gerald G. Crutsinger; John F. Booth; Monty L. Ross

[57] ABSTRACT

Apparatus for imparting thermal energy to or removing thermal energy from a food product, said apparatus comprising intensive and semi-intensive thermal treatment sections and at least one equilibrating section.

4 Claims, 11 Drawing Figures

FIG. 9

THERMAL TREATMENT OF FOOD PRODUCTS

CROSS REFERENCE TO RELATED APPLICATION

This application is a continuation in part of copending application Ser. No. 286,060, filed July 22, 1981, now U.S. Pat. No. 4,409,453, which is incorporated by reference herein.

TECHNICAL FIELD

This invention relates to an improved apparatus and method for rapidly and effectively transferring thermal energy either into or out of food products. One aspect of the invention relates to an apparatus comprising a plurality of adjacent thermal treatment zones adapted to rapidly heat and/or cool food products passing sequentially therethrough. A further aspect of the invention relates to an apparatus and method useful for substantially equilibrating the temperature throughout a food product undergoing thermal treatment.

BACKGROUND OF THE INVENTION

It is well known that the texture, flavor, odor and appearance of many food products are significantly affected by the temperatures at which such products are prepared, stored and served. It has also been appreciated that moisture content, another important factor in the overall desirability or acceptability of food products, is greatly affected by the thermal treatment accorded to such products. Many complex chemical and physical changes in food products are brought about by the manner in which their temperature and moisture content are regulated.

Because of these and other considerations, numerous different apparatus and methods for heating and cooling food products have been disclosed in the prior art. Thus, for example, direct fired ovens, hot air convection ovens, infrared ovens and microwave ovens have all been utilized, either alone or in combination, to impart thermal energy to food products. Similarly, cooling has been accomplished by conventional refrigeration, flash-freezing, liquid freezant immersion, cryogenic freezing and the like. Particularly desirable and effective apparatus and methods for imparting thermal energy to food products have previously been disclosed in U.S. Pat. Nos. 3,884,213 and 4,154,861.

The apparatus and methods disclosed in the foregoing patents employ columnated jets of air or other gaseous fluid to create discrete areas of very high heat transfer on the surface of a food product. This high heat transfer accomplishes the advantageous effects of crisping, browning, searing, chilling, or freezing in those localized areas where the jets impinge against the surface of the product. When the jets are of proper size, spacing, temperature, velocity and direction, very desirable results are obtained. Furthermore, when the food products are passed beneath the jets at a selected rate, these effects are spread evenly over the surface.

Calculations, measurements of heat transfer and evident results on products heated illustrate that the impingement of jets of air substantially perpendicularly to the surface of the product accomplishes heat transfer rates of 2 to 10 times greater than heat transfer of the same volume of air moving parallel to the product surface. This relatively new, very rapid heat transfer is desirable to initiate rapid cooking, baking, cooling or freezing. However, because most food products and recipes or procedures for their preparation are designed with the thought in mind of heating or cooling those products by conventional means, they may not be prepared satisfactorily if they are only subjected to intensive impingement heating or cooling as previously disclosed. Although impingement heating or cooling can very quickly bring the surface temperature of the food products to very near that of the impinging gas, interior portions of those products may not be satisfactorily prepared by intensive impingement heating or cooling alone. Apparatus and methods are therefore needed for thermally treating food products in such manner that both the surface and interior portions of those products are satisfactorily prepared.

One method previously disclosed for heating both the surface and interior portions of food products is through use of microwave radiation in combination with impingement heating. When microwave energy is employed in combination with the columnated jets of heated gas impinging on the surface of the food products, internal and external heating can be accomplished simultaneously. However, the use of microwave energy is not well suited for all situations. For example, when using microwave energy, particular care must be taken to seal the enclosure in which the cooking is done in order to prevent the escape of potentially dangerous and harmful microwave radiation. Such difficulties become even more significant when dealing with conveyorized industrial or institutional sized ovens. Also, while microwave energy is effective for heating the interior portions of food products, there is no analogous apparatus or method that is similarly effective for cooling the interior portions of food products.

Therefore, an apparatus and method are needed for rapidly and efficiently heating and/or cooling both the surface and interior portions of food products. An apparatus and method are also needed that can further reduce the time and energy required to sequentially heat and cool food products, as is required in the preparation of many precooked, chilled or frozen foods.

SUMMARY OF THE INVENTION

I have devised an improved apparatus and method for transferring thermal energy into or out of food products. The apparatus and method of the invention preferably employ at least one intensive or semi-intensive thermal treatment zone or section for supplying columnated jets of a gaseous fluid to the exterior surfaces of food products moving relative thereto in combination with at least one equilibrating zone or section for promoting heat transfer into or out of the interior portions of the food products. Through use of the disclosed apparatus and method, those working in the food preparation industries will now be able to either heat or cool many food products with minimal time and energy requirements while simultaneously achieving significantly improved thermal equilibrium throughout the food products, thereby improving overall product quality in a manner that has not been possible prior to the present invention.

A primary object of the invention is to provide an apparatus and method for effectively and efficiently promoting the transfer of thermal energy into or out of a food product and for controlling the distribution of thermal energy throughout the interior of the food product.

Another object of the invention is to provide an apparatus and method for transferring thermal energy into or out of a food product through the use of at least one intensive or semi-intensive thermal treatment section in combination with at least one equilibrating section.

Another object of the invention is to provide an apparatus and method for transferring thermal energy into or out of a food product through use of at least one intensive thermal treatment section in combination with at least one semi-intensive thermal treatment section.

A further object of the invention is to provide a conveyorized cooking apparatus employing an intensive heating section with columnated jets of a relatively hotter gas for rapidly transferring thermal energy to a food product moving relative thereto in combination with an equilibrating section for promoting the penetration of thermal energy to the interior portions of the food product.

A further object of the present invention is to provide a conveyorized apparatus for cooling food products that employs columnated jets of a relatively colder gas to cool a food product moving relative to said jets in combination with an equilibrating section for promoting the transfer of thermal energy out of the interior portions of food products so as to reduce their overall level of thermal energy.

Another object of the invention is to provide an apparatus and method for promoting the transfer of thermal energy into or out of a food product through the use of an intensive thermal treatment section, a semi-intensive thermal treatment section, and a separate equilibrating section.

Another object of the invention is to provide an apparatus comprising at least one intensive or semi-intensive thermal treatment section for imparting thermal energy to or removing thermal energy from a food product moving relative thereto, in combination with at least one equilibrating section for bringing the interior and surface portions of the food product into substantial thermal equilibrium after the food product has exited the intensive or semi-intensive thermal treatment section.

A further object of the invention is to provide a cooking apparatus comprising an intensive cooking section and a semi-intensive cooking section in combination with at least one equilibrating section adjacent to the end of at least one of the cooking sections.

A further object of the invention is to provide an apparatus for cooling food products through use of one or more intensive or semi-intensive cooling sections in combination with at least one equilibrating section adjacent to the end of at least one of the cooling zones.

A further object of the invention is to provide an apparatus useful for promoting substantial thermal equilibrium between the exterior surfaces and interior portions of a food product.

Another object of the invention is to provide a method for imparting thermal energy to or removing thermal energy from a food product by subjecting the surface of the food product to columnated jets of a gaseous fluid having greater or lesser thermal energy than the surface portions of the food product, and thereafter bringing the interior portions of the food product into substantial thermal equilibrium with the surface portions of the food product by maintaining the food product in a relatively less turbulent atmosphere having a thermal energy level with which the interior portions of the food product are desired to be brought into thermal equilibrium.

A further object of the invention is to provide an apparatus and method that will reduce the time and energy required for the thermal treatment of certain precooked frozen foods.

In some cases the foregoing objects may be accomplished by adapting the apparatus of the invention with means to perform the desired functions within a single enclosure and by programming the apparatus to perform those functions in a desired sequence.

Other and further objects of the invention will become apparent upon reading the detailed description of the invention in relation to the drawings annexed hereto and briefly described below.

BRIEF DESCRIPTION OF THE DRAWINGS

The subject invention, together with further objects and advantages thereof, may best be understood by reference to the following description taken in connection with the accompanying drawings in which.

Numeral references are employed to designate like parts throughout the various figures of the drawing.

DESCRIPTION OF A PREFERRED EMBODIMENT

Figure 1:
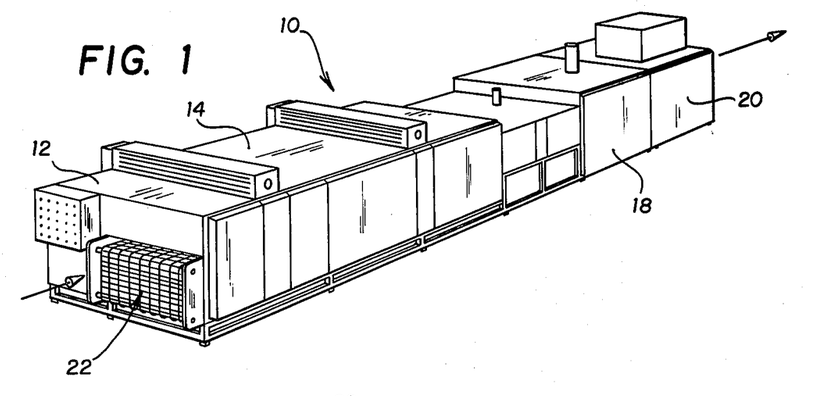
FIG. 1 is a perspective view of one preferred embodiment of the thermal treatment apparatus of the invention having an intensive heating section, a semi-intensive heating section, an equilibrating section, a semi-intensive cooling section, and an intensive cooling section combined in an adjacent and contiguous, communicating relationship.

Referring to FIG. 1, one preferred embodiment of thermal treating apparatus 10 of the invention preferably comprises intensive heating section 12, semi-intensive heating section 14, equilibrating section 16, semi-intensive cooling section 18 and intensive cooling section 20. The various sections are preferably positioned in adjacent, contiguous and communicating relationship so as to permit a food product introduced into intensive heating section 12 of thermal treating apparatus 10 by conveyor means 22 to be transported longitudinally through each successive adjacent section, finally exiting from intensive cooling section 20.

Although FIG. 1 depicts a preferred embodiment useful for sequentially heating and cooling food products, it is be understood that the thermal treatment section or sections and the equilibrating section or sections of the invention can be variously arranged and combined, depending upon the particular food product and method of preparation or storage involved. Thus, thermal treating apparatus 10 may comprise a plurality of intensive and semi-intensive heating sections in combination with one or more equilibrating sections, without any cooling section. Similarly, one or more cooling sections may be employed in combination with an equilibrating section without the need for any heating section. Also, it may be preferable for some applications to employ equilibrating sections between intensive and semi-intensive heating sections, between semi-intensive or intensive cooling sections, or both. According to one preferred embodiment of the present invention, it is desirable that thermal treating apparatus 10 comprise at least one intensive or semi-intensive thermal treatment section for supplying columnated jets of a gaseous fluid to the exterior surfaces of a food product moving relative thereto in combination with at least one equilibrating or tempering section having a relatively less turbulent atmosphere in which the surface and interior portions of the food product are desirably brought into substantial thermal equilibrium.

According to another preferred embodiment of the invention, it is desirable that thermal treating apparatus 10 comprise at least one intensive thermal treatment section and at least one semi-intensive thermal treatment section for supplying columnated jets of gas to impinge on the exterior surface of a food product in relative motion thereto.

The structure and function of the different sections of thermal treating apparatus 10 of FIG. 1 are separately described and explained below. It is understood, however, that thermal treating apparatus 10 can be fabricated and constructed either in separate modules or on a unitary framework or supporting structure. When fabricated in separate modules, the various sections of thermal treating apparatus 10 can be fastened to each other, to the floor, or by some other method in order to maintain the correct positional alignment between them. Similarly, thermal treating apparatus 10 can be adapted in such manner that conveyor means 22 comprises a unitary carriage traversing a single closed loop extending longitudinally throughout thermal treating apparatus 10. Nevertheless, it is also within the scope of the invention to employ a plurality of carriages in sequential relation to transport a food product longitudinally through thermal treating apparatus 10. By using a plurality of shorter carriages, it may be possible to simplify fabrication, assembly, maintenance, and repair. Moreover, depending upon the particular food product, configuration and application, it may be desirable for different carriages of conveyor means 22 to advance at different speeds through the various sections of thermal treating apparatus 10.

Intensive heating section 12 and semi-intensive heating section 14 of FIG. 1 are further described and explained with reference to FIGS. 2-5A. Intensive heating section 12 and semi-intensive heating section 14 each comprise a cabinet having interior and exterior top walls 24, 26, bottom walls 28, 30, side walls 32, 34, back walls 56, 57 and front walls 59, 61, respectively, and are preferably constructed from a metallic material such as stainless steel, aluminized steel, or the like. Insulating material 36 is preferably disposed between the interior and exterior walls of intensive heating section 12 and semi-intensive heating section 14 in order to minimize heat loss to the surrounding air. Intensive heating section 12 and semi-intensive heating section 14 further comprise supporting structure 38 for maintaining those sections in a desirable elevational and positional relation to the user, to each other and to other related equipment. Conveyor means 22 transports food products 40 longitudinally through cooking chamber 42 defined by interior top, bottom, side, back and front walls 24, 28, 32, 56, 59 respectively, of intensive heating section 12 and semi-intensive heating section 14. Conveyor means 22 further comprises carriage 44 supported by rollers 46 rotatably secured to exterior sidewalls 34 for movement along tracks or guide surfaces that are secured to the interior back and front walls 56, 59, respectively, of intensive heating section 12 and semi-intensive heating section 14. Carriage 44 is preferably mounted so that the elevation of food products 40 within cooking chamber 42 can be adjusted as desired. Conveyor means 22 is preferably driven by a variable speed motor that will permit the user to vary the speed at which food products 40 advance through cooking chamber 42. In other embodiments of the invention, alternate means (such as, for example, a carousel) an be satisfactorily employed to transport food products 40, depending on the physical configuration of the particular apparatus utilized.

Figure 4:
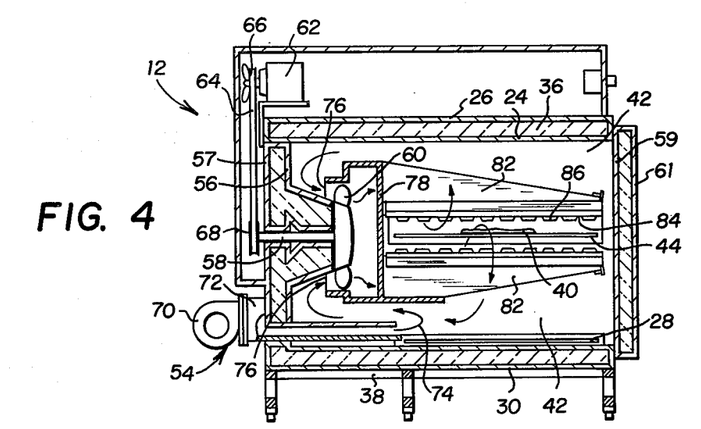
FIG. 4 is a side elevation view of the intensive heating section of FIGS. 1-3.

Intensive heating section 12 and semi-intensive heating section 14 further comprise a plurality of jet fingers 48 communicating through plenum 50 with blower means 52 which is preferably secured to back wall 56,57. As shown in FIG. 4, blower means 52 preferably comprises rotating shaft 58 having impeller means 60 secured thereto. Rotating shaft 58 is driven by motor 62 through belt 64 passing from pulley 66 mounted on the output shaft of motor 62 to pulley 68 mounted on rotating shaft 58. Although impeller means 60 employed in the preferred embodiment of the invention is an axial flow, pitched-blade fan, other impeller means such as, for example, radial-flow, squirrel cage fans can also be successfully employed for use in some applications. Furthermore, although rotating shaft 58 is shown in FIG. 4 as being belt-driven by motor 62, it is understood that impeller means 60 and motor 62 can also be constructed in a direct drive configuration.

Heat source 54 is desirably located beneath blower means 52 or in some other position suitable for introducing a heated gas into cooking chamber 42, where it is combined and mixed with gas being recirculated from jet fingers 48 through blower means 52. Because of the relatively high velocity of the gas circulating through cooking chamber 42, the entire volume of gas is recirculated about once each second, thereby assuring satisfactory distribution of the thermal energy input by heat source 54.

Heat source 54 preferably comprises heat source blower means 70 and heat source air duct 72 communicating through outlet 74 with cooking chamber 42. According to one embodiment of the invention, ambient air drawn through inlet 71 by heat source blower means 70 is passed across a heating means positioned in heat source air duct 72 and is thereafter discharged through outlet 74 into cooking chamber 42. The heating elements which supply thermal energy to the air or other gaseous fluid passing through heat source air duct 72 can comprise, for example, electrical resistance heating elements, gas-fired burners, oil burners, or some other suitable source of thermal energy. According to one preferred embodiment of the invention, a thermostat sensor is positioned near inlet port 76 to plenum 50 to monitor the temperature of the gas being recirculated through cooking chamber 42 by blower means 52.

Jet fingers 48 and plenum 50 are preferably constructed from a metallic sheet material such as stainless steel or aluminized steel and are positioned inside cooking chamber 42 and secured to the interior walls of intensive heating section 12 and semi-intensive heating section 14 by suitable mounting brackets, or the like.

Plenum 50 preferably surrounds impeller means 60 and communicates through inlet port 76 and outlet ports 78 with cooking chamber 42 and jet fingers 48, respectively. According to one embodiment of the invention, dampers are positioned in each of outlet ports 78 to control the flow of heated air from plenum 50 into each of jet fingers 48. According to a preferred embodiment of the invention, rear walls 80 of plenum 50 are inwardly tapered as plenum 50 extends outwardly from impeller means 60 to assist in controlling the pressure and volume of heated gas that is delivered through the outer jet fingers 48 to food products 40 on carriage 44.

Upper and lower jet fingers 48 further comprise tapered ducts 82 and orifice plates 84 for directing columnated jets of heated gas against the upper and lower surfaces of food products 40 passing therebetween on carriage 44. According to the embodiment of the invention shown in FIGS. 2–3, upper and lower jet fingers 48 are positioned so that they are directly opposed. It is understood, however, that in some applications upper and lower jet fingers 48 are desirably offset, and the lateral spacing between successive upper or lower jet fingers 48 can vary independently. Although the dimensions and relative spacing of the jet fingers in relation to each other and to food products 40 on carriage 44 can vary, the dimensions and spacing are desirably such that the columnated jets of heated gas discharged through orifices 86 in orifice plates 84 contact the entire upper and lower surfaces of food products 40 as the food products pass longitudinally through intensive heating section 12 and semi-intensive heating section 14. Preferably, the lateral spacing between adjacent jet fingers is sufficient to permit the gas discharged through orifices 86 to be recirculated between jet fingers 48 and behind plenum 50, where it reenters plenum 50 through inlet ports 76 behind impeller means 60.

The vertical spacing between opposed jet fingers 48 in intensive heating section 12 and semi-intensive heating section 14 is preferably adequate to permit the unimpeded passage of food products 40 therebetween. The preferred vertical spacing between opposed jet fingers 48 will also depend on the diameter and relative spacing of orifices 86 in orifice plates 84.

Figure 5:
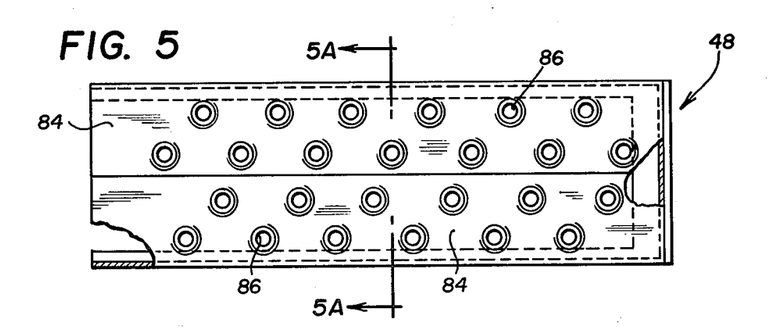
FIG. 5 is a plan view, partially cut away, of a lower jet plate as shown in FIGS. 2-4.

A plan view, partially in section, of a lower jet finger 48 suitable for use in the present invention is shown in FIG. 5. Referring to FIG. 5, jet finger 48 preferably comprises spaced apart orifices 86 in orifice plate 84 that communicate through tapered ducts 82 with plenum 50 as shown in FIG. 4. The spacing for return of impinged air between orifices 86 is preferably at least twice their diameter so that sufficient space is provided between adjacent jets that the returning air does not impede the flow of the columnated jets of heated gas being discharged through orifices 86. Such spacing permits the flow of diffused gas resulting from impingement of the columnated jets of heated gas against the surface of the food product through spaces between the jets through cooking chamber 42 to the inlet ports 76 behind impeller means 60 at the rear of plenum 50. Such spacing also results in application of discrete areas of high and low gas pressure over the surface of the product, permitting the impinging gas to flow over the surface to an adjacent low pressure area.

Figure 5A:
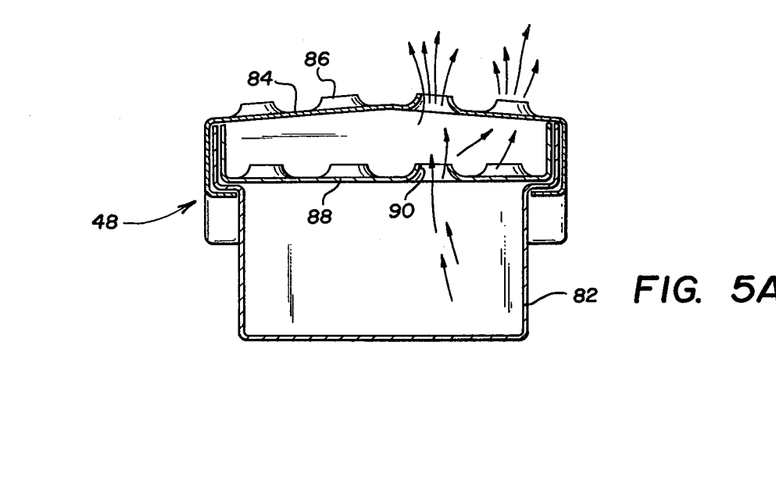
FIG. 5A is a sectional view taken along line A—A of FIG. 5.

Referring to FIG. 5A, jet fingers 48 preferably further comprise columnating plate 88 in spaced apart relation to orifice plate 84. Columnating plate 88 comprises orifices 90 concentrically aligned with orifices 86 in orifice plate 84, although columnating plate 88 lies in a substantially horizontal plane, whereas orifice plate 84 is slightly inclined relative thereto to assist in diffusing the columnated jets of gas passing through orifices 86 of the surface of food products 40. In a particularly preferred embodiment, a common centerline passing through orifices 86 and 90 is desirably inclined about two and a half degrees from a vertical line extending through the center of orifice 86. Columnating plate 88 is desirably employed in combination with orifice plate 84 in order to produce the columnated jets of heated gas that impinge on the upper and lower surfaces of food products 40. Without the use of a columnating means such as columnating plate 88, the heated gas passing from tapered ducts 82 through orifices 86 would diffuse too rapidly before impinging against the surface of food products 40 in cooking chamber 42. Furthermore, while it is understood that a jet finger 48 comprising columnating plate 88 in combination with orifice plate 84 is a preferred apparatus for producing the columnated jets of heated gas, other means for producing the jets can also be employed within the scope of the invention. Thus, for example, vertical tubes having an outlet diameter equivalent to that of orifices 86 in orifice plate 84 can be secured to orifice plates 84 so as to produce the columnated jets as desired. The use of such tubes is illustrated, for example, in U.S Pat. No. 4,154,861.

Figure 2:
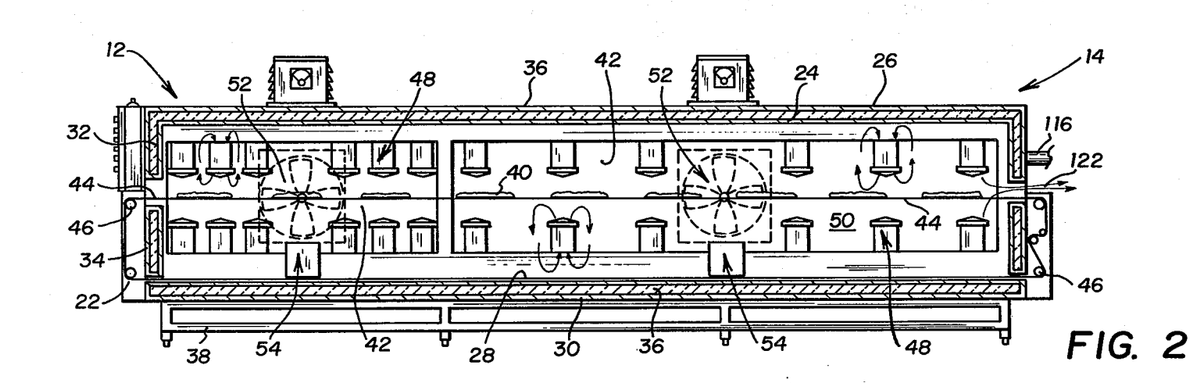
FIG. 2 is a front elevation view, partially in section, of the intensive and semi-intensive heating sections of the apparatus of FIG. 1.
Figure 3:
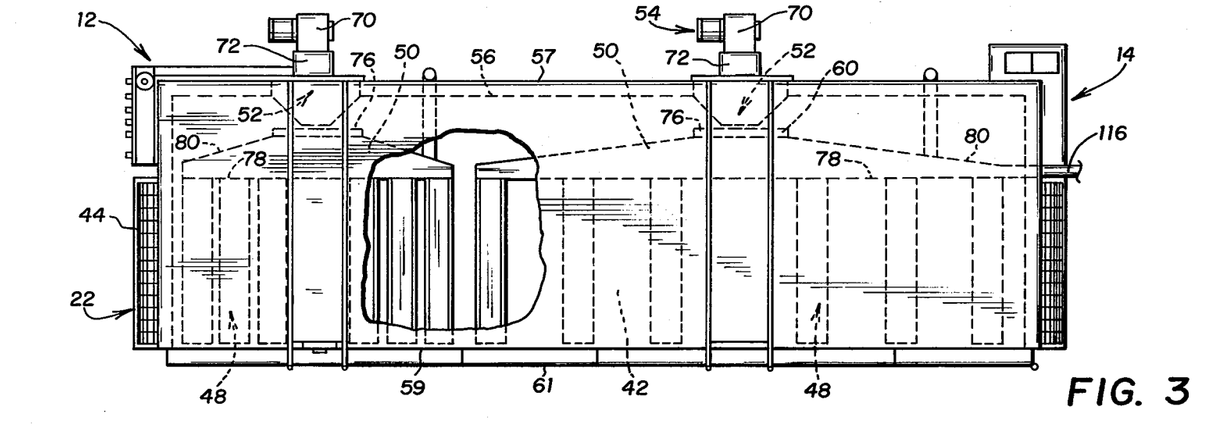
FIG. 3 is a plan view, partially in section, of the intensive and semi-intensive heating sections of FIGS. 1 and 2.

The principal difference between intensive heating section 12 and semi-intensive heating section 14 resides in the relative rate at which thermal energy is imparted to the surface of food products 40 by the gas jets impinging thereon. One method of controlling the rate is by changing the relative lateral spacing of jet fingers 48. Other methods include, for example, varying the orifice size or spacing, employing dampers to restrict the flow of gas to different jet fingers, blocking off certain orifices within a single jet finger, and the like. According to one embodiment, as shown in FIGS. 1-3, jet fingers 48 in semi-intensive heating section 14 are laterally spaced approximately twice as far apart as in intensive heating section 12. The number of jet fingers 48 in intensive heating section 12 and semi-intensive heating section 14 is the same although the lineal distance traversed by food products 40 on carriage 44 while passing through intensive heating section 12 is only half of the distance traversed while passing through semi-intensive heating section 14. In other words, the number of columnated jets of heated gas to which food products 40 are subjected for each foot of travel through intensive heating section 12 is approximately twice as great as the number of columnated jets to which food products 40 are subjected per foot of travel through semi-intensive heating section 14. Typically, food products 40 enter thermal treating apparatus 10 with a high moisture content and at room temperature, or in any event, at a temperature less than that desirable for cooking the food products. A major portin of the desired total thermal energy to be supplied to food products 40 during cooking is applied to food products 40 in intensive heating section 12. In this manner, the surfaces of food products 40 are quickly raised to cooking temperatures, and excess moisture is simultaneously removed. According to a preferred embodiment of the invention, more than about two-thirds of the overall thermal energy to be applied to food products 40 during the cooking stage is applied in intensive heating section 12 of thermal treating apparatus 10. Once the moisture content of the surface of food products 40 is reduced and the surface temperature is elevated to an appropriate cooking temperature, food products 40 are preferably transported into and through semi-intensive heating section 14. In semi-intensive heating section 14, thermal energy is applied to food products at a less intensive rate. The rate at which thermal energy is applied to food products 40 in semi-intensive heating section 14 is desirably reduced in order to permit the thermal energy to penetrate to the interior portions of food products 40 and to permit excess moisture to migrate from the interior portions of food products 40 to the surface. In this manner it is possible to continue cooking food products 40 without burning or excessively drying the food surfaces. According to a preferred embodiment of the invention, less than half and most preferably, less than about one-third, of the overall thermal energy to be applied to food products 40 during the cooking stage is applied while food products 40 are passing through semi-intensive heating section 14 of thermal treating apparatus 10.

While it is believed that the general considerations described above will apply to most food products, it is understood that the various parameters discussed in connection with the preferred embodiments of intensive heating section 12 and semi-intensive heating section 14 can vary according to the particular food product for which thermal treatment is desired. Thus, for example, the composition, temperature, pressure, velocity, and width of the columnated jets of heated gas, the dimensions, number and relative spacing of jet fingers 48, and the configuration, elevation and speed of advance of conveyor means 22 can all be varied so as to achieve the optimum temperature, moisture content, and associated rate of cooking that is desired for a particular product.

While in the preferred embodiment, intensive heating section 12 and semi-intensive heating section 14 are each shown as having a single plenum through which heated gas is forced by a single impeller means, it is understood that other configurations employing different combinations of plenums and blower means can be similarly employed within the scope of the invention.

According to a preferred embodiment of the invention, food products 40 being discharged from semi-intensive heating section 14 are next transported into equilibrating section 16 as shown in FIGS. 6-9. Equilibrating section 16 comprises equilibrating chamber 94 having a carriage 44A disposed therein that is preferably aligned so as to cooperate with carriage 44 of semi-intensive heating section 14 of thermal heating apparatus 10. Equilibrating section 16 comprises a cabinet consisting of interior and exterior top walls 96, 98, side walls 102, 104, back walls 106, 108, front walls 110, 112, respectively, and bottom surface 100, and is elevated to a desired height by supporting structure 114. The cabinet portion of equilibrating section 16 is preferably constructed from metallic materials, and the respective interior and exterior walls are preferably constructed from a metallic sheet material such as, for example, stainless steel, aluminized steel, or the like. Insulating material 116 can be utilized between the respective interior and exterior walls of the cabinet portion of equilibrating section 16. However, where sheets of stainless steel are employed in making the respective walls, the use of insulating material 116 may not be required.

Food products 40 are transported through equilibrating section 16 on carriage 44A. Carriage 44A is understood to be a part of conveyor means 22 of thermal treating apparatus 10 and may be part of a unitary conveyor means extending from intensive heating section 12 and semi-intensive heating section 14 into equilibrating section 16, or may be an independently controlled portion of conveyor means 22 that is positioned in cooperating alignment with carriage 44A of intensive heating section 12 and semi-intensive heating section 14 as set forth above.

Equilibrating section 16 is adapted to discharge heated gas into equilibrating chamber 94 through inlet duct 116, which extends transversely through interior and exterior side walls 102, 104 of equilibrating section 16 and outside wall 34 of semi-intensive heating section 14 from plenum 50 as shown in FIG. 3. Thus, equilibrating chamber 94 of equilibrating section 16 communicates with plenum 50 of semi-intensive heating section 14 and a minor portion of the heated gas discharged by blower means 52 of semi-intensive heating section 14 is controllably introduced into equilibrating section 16. The flow of heated gas through inlet duct 116 into equilibrating chamber 94 of equilibrating section 16 is preferably controlled by damper 118 or a functional equivalent thereof. According to a particularly preferred embodiment of the invention, the amount of heated gas discharged through inlet duct 116 into equilibrating chamber 94 of equilibrating section 16 is less than about 10 percent of the total amount of heated gas discharged into plenum 50 by blower means 52 of semi-intensive heating section 14.

Figure 6:
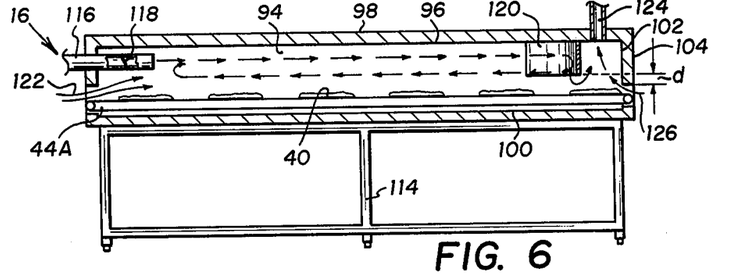
FIG. 6 is a front elevation view, partially in section, of the equilibrating section of FIG. 1.
Figure 7:
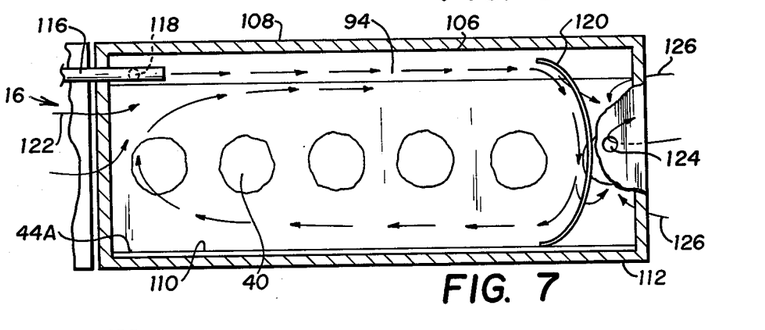
FIG. 7 is a plan view, partially in section, of the equilibrating section of FIGS. 1 and 6.

According to the embodiment of equilibrating section 16 shown in FIGS. 6-7, curved baffle 120 extends downward from interior top wall 96 and is positioned transversely across equilibrating section 16 over carriage 44A on which food products 40 are transported. Curved baffle 120 is desirably positioned near the point where food products 40 exit from equilibrating section 16 on carriage 44A and deflects a major portion of the heated gas introduced through inlet duct 116 back through equilibrating chamber 94 toward the entrance of equilibrating section 16. Referring also to FIG. 2, it is seen that some heated gas designated by arrows 122 enters equilibrating chamber 94 of equilibrating section 16 from equilibrating chamber 42 of semi-intensive heating section 14. This flow arises from the "splashing" effect of the opposed columnated jets of air converging on each other or impinging on product from the outermost upper and lower jet fingers 48 of semi-intensive heating section 14. In this embodiment, the heated gas designated by arrows 122 combines with the heated gas entering through inlet duct 116 to recirculate air deflected by curved baffle 120 throughout equilibrating chamber 94 of equilibrating section 16. A minor portion of the heated air impinging on curved baffle 120 is deflected downwardly, underneath said baffle, and exits equilibrating chamber 94 of equilibrating, section 16 through vent pipe 124 traversing interior and exterior top walls 96, 98. As heated gas passes under curved baffle 120 and upward through vent pipe 124, a minor amount of outside air is also drawn in under interior and exterior side walls 102, 104 as designated by arrows 126 in FIGS. 6-9. According to a particularly preferred embodiment of the invention, interior and exterior side walls 102, 104 desirably extend downward to a point that is just high enough to permit food products 40 to exit equilibrating section 16 on carriage 44A. The bottom of curved baffle 120 is preferably higher than the bottom of interior and exterior side walls 102, 104 to promote the flow of air or other gas as described above. The vertical distance between the bottom of curved baffle 120 and side walls 102, 104 is shown as the distance "d" in FIG. 6, and is preferably about one inch. Also, the vertical distance between the bottom of curved baffle 120 and the top of carriage 44A is preferably less than the vertical dimension of curved baffle 120.

Figure 8:
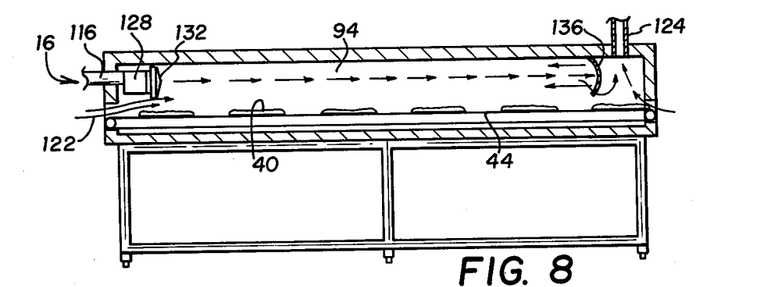
FIG. 8 is a front elevation view, partially in section, of an alternate embodiment of the equilibrating section of FIG. 1.
Figure 9:
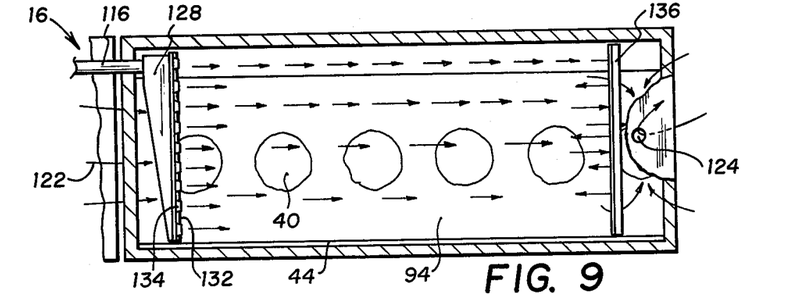
FIG. 9 is a plan view, partially in section, of the equilibrating section of FIG. 8.

An alternate embodiment for equilibrating section 16 of thermal treating apparatus of the invention is depicted in FIGS. 8-9. In FIGS. 8-9, inlet duct 116 introduces heated gas into equilibrating jet finger 128 which is secured thereto in such manner that columnated jets of heated gas are discharged into equilibrating chamber 94 of equilibrating section 16 in a longitudinal direction parallel to the direction of travel of food products 40 on carriage 44A. Equilibrating jet finger 128 is constructed in the manner previously described for jet fingers 48 of intensive heating section 12 and semi-intensive heating section 14 of thermal treating apparatus 10, and thus comprises tapered duct 130, orifice plate 132 having orifices 134 positioned therein that are concentrically aligned with cooperating orifices in a spaced apart columnating jet plate (not shown). In the embodiment shown in FIGS. 8 and 9, jets of heated gas discharged from orifices 134 in equilibrating jet finger 128 impinge against curved baffle 136, and a major portion of the heated gas impinging on curved baffle 136 is deflected back toward equilibrating jet finger 128, thereby setting up a recirculating air flow within equilibrating chamber 94 of equilibrating section 16.

As previously described in regard to FIGS. 6 and 7, vent pipe 124 is positioned behind curved baffle 136 to vent gas passing underneath the baffle. The relative elevation between the bottom of curved baffle 136 and the bottom of interior and exterior side walls 102, 104 is preferably the same as has previously been described in relation to FIG. 6.

Although the embodiments shown in FIGS. 6-9 only provide for the introduction of heated gas into equilibrating chamber 94 of equilibrating section 16 at a position above food products 40 being transported on carriage 44A, it is understood that it may be preferable for some applications to construct equilibrating section 16 in such manner that heated gas is introduced into equilibrating section 94 both above and below food products 40 through a plurality of ducts communicating with plenum 50 of the preceding heating section. Furthermore, while equilibrating section 16 has been described herein as receiving heated gas discharged from semi-intensive section 14, it is understood from the earlier explanation in regard to FIG. 1 that where equilibrating section 16 is positioned adjacent to an intensive heating section, heated gas from the intensive heating section can be similarly discharged into equilibrating section 16.

In equilibrating section 16, the interior portions of food products 40 are desirably brought into thermal equilibrium with their outside surfaces. In other words, equilibrating chamber 94 of equilibrating section 16 is maintained by means of the apparatus disclosed herein as an environment in which thermal energy is able to penetrate to the inner portions of food products 40 without causing unwanted burning, scorching, blistering or excessive drying on the outside surfaces of those products. Through use of equilibrating section 16, the atmosphere surrounding food products 40 is maintained at a temperature substantially equivalent to that of the columnated jets of heated gas that impinged directly upon the food surface in the intensive and semi-intensive heating sections. In equilibrating section 16, the rate at which thermal energy is supplied to food products 40 is generally much less than in intensive heating section 12 and semi-intensive heating section 14. This can be attributed largely to the lower flow rates and velocities of the heated gas in equilibrating section 16, and also to the difference in the angle at which the gas contacts the food surface. It should be understood, however, that the introduction of gas from an intensive or semi-intensive section is not always required for successful operation of the equilibrating section.

According to another preferred embodiment of the invention, equilibrating section 16 is employed in combination with another heating section into which food products pass after exiting equilibrating section 16. In equilibrating section 16, the surface portions of food products 40 may be somewhat cooled by the evaporation of moisture that migrates toward the surface as thermal energy penetrates into the interior portions of those food products. By subjecting food products 40 to a subsequent heating section in which columnated jets of air impinge directly on the food surfaces, it is possible to drive off any remaining excess moisture and once again raise the surface temperature to the desired level. When a thermal treating apparatus having this configuration is utilized, it may be desirable to slightly undercook the surface of food products 40 in the heating section or sections so that the columnated jets of heated gas in the heating section following the equilibrating section can be utilized to bring the surface of food products 40 to the optimum desired temperature and degree of doneness. One satisfactory method for achieving desirable results with some food products is to position an equilibrating section following an intensive heating section and in advance of a semi-intensive heating section.

Figure 10:
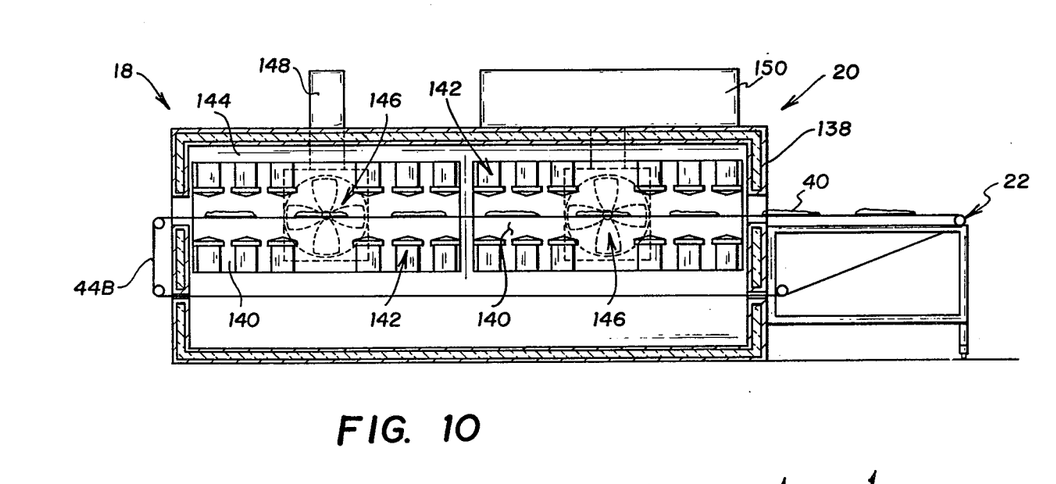
FIG. 10 is a front elevation view of the semi-intensive and intensive cooling sections of the apparatus shown of FIG. 1.

When food products 40 cooked by means of the apparatus and methods disclosed herein are desired to be cooled or frozen for shipment and/or storage, semi-intensive and intensive cooling equipment employing jet fingers similar to those previously disclosed for the intensive and semi-intensive heating sections can be utilized in thermal heating apparatus 10 of the invention. FIG. 10 illustrates a front elevation view, partially in section, of semi-intensive cooling section 18 and intensive cooling section 20, as shown in FIG. 1. Semi-intensive cooling section 18 and intensive cooling section 20 comprise cabinets 138 having interior and exterior top, bottom, front, back and side walls, which are preferably insulated, at least in intensive cooling section 20, to minimize refrigeration requirements. Disposed within cabinet 138 of each cooling section is a plenum 140 communicating with a plurality of jet fingers 142 which are further disposed above and below a carriage 44B in cooling chamber 144 for transporting food products 40 therebetween through the cooling sections. A gas that is relatively cooler than food products 40 is discharged through plenums 140 and jet fingers 142 so as to impinge on the surface of food products 40 moving through semi-intensive cooling section 18 and intensive cooling section 20 on carriage 44B.

According to one preferred embodiment of the invention, the relatively cool gas utilized in semi-intensive cooling section 18 is either room temperature air or ambient outside air supplied to cooling section blower means 146 of semi-intensive cooling section 18 through cooling gas inlet duct 148.

When food products 40 enter semi-intensive cooling section 18 at a temperature considerably in excess of room temperature or ambient outside temperature, cooling can be achieved through use of the relatively cooler air without the need for expensive refrigeration. As food products 40 progress through semi-intensive cooling section 18, the temperature differential between the surface of food products 40 and the cooling gas supplied through jet fingers 142 decreases rapidly. Desirably, the surface temperatures of food products 40 exiting semi-intensive cooling section 18 are at or slightly above room temperature.

According to the embodiment of the invention shown in FIGS. 1 and 10, food products 40 pass from semi-intensive cooling section 18 into intensive cooling section 20. In intensive cooling section 20, refrigerated air is supplied from refrigeration unit 150 through cooling gas inlet duct 152 to the inlet of cooling section blower means 146. Cooling section blower means 146 discharges the refrigerated cooling gas through plenum 140 and jet fingers 142 so as to impinge on the surface of food products 40 passing therebetween on carriage 44B. Cooling gas discharged through jet fingers 142 is returned behind plenum 140 and recirculated through refrigeration means 150. In intensive cooling section 20, the temperature of food products 40 is desirably reduced very quickly to a temperature that is satisfactory for shipment or storage of that particular product.

Because direct impingement of the columnated jets of relatively cool gas will cool the surface portions of food products 40 more quickly than the interior portions of those products, thermal energy will continue to move along the gradient between the interior and surface portions until a thermal equilibrium is reached. For this reason, it may be desirable to interpose at least one equilibrating section between semi-intensive cooling section 18 and intensive cooling section 20 of thermal treating apparatus 10. According to this embodiment, a minor portion such as, for example, less than about 10 percent of the relatively cooler gas from semi-intensive cooling section 18 is introduced from the end of plenum 140 of semi-intensive cooling section 18 into the cooling chamber of the equilibrating section. Structurally, an equilibrating section suitable for use with the cooling sections disclosed herein is substantially the same as that as previously described for use with the heating sections of the invention.

The lateral spacing desired for jet fingers 142 in semi-intensive cooling means 18 and intensive cooling means 20 can vary, for example, according to the temperature differential between incoming food products 40 and the cooling gas discharged through jet fingers 142, the physical dimensions, configuration, and spacing of food products 40, the rate of advance of carriage 44B, and the like. Thus, for food products 40 having large surface area to volume ratios, jet fingers 142 may be spaced relatively closely. On the other hand, for food products 40 having small surface area to volume ratios, additional time is required to equilibrate the thermal energy gradient that exists between the interior and surface portions, and wider lateral spacing between jet fingers 142 may be desirable in order to permit the thermal energy to move from the interior to the surface.

While the present invention has been described in relation to its preferred embodiments, other alterations and modifications will become apparent to those of ordinary skill in the art upon reading this disclosure, and it is therefore intended that the present invention be limited only by the scope of the appended claims.

I claim:

1. Apparatus for imparting thermal energy to or removing thermal energy from food products, said apparatus comprising a plurality of sequentially arranged thermal treatment sections and a conveying means for transporting food products sequentially through each of said sections; at least one of said sections comprising an impingement thermal treatment section further comprising a plurality of jet fingers disposed transversely to said conveying means and adapted to direct a plurality of columnated jets of a temperature-controlled gaseous medium substantially perpendicularly against said conveying means so as to impinge against the exterior surface of a food product moving relative to said columnated jets of gas on said conveying means, thereby imparting to or removing from the surface of said food product a portion of the thermal energy that is desired to be imparted to or removed from said food product, duct means communicating with said jet fingers and adapted to direct the flow of said temperature-controlled gaseous medium thereto, plenum means adapted to distribute said temperature-controlled gaseous medium to said duct means, cabinet means adapted to support said jet fingers, duct means and plenum means so as to define a cooking chamber around said conveying means, blower means disposed within said cabinet means and adapted to discharge said temperature-controlled gaseous medium into said plenum means; and at least one of said thermal treatment sections comprising an equilibrating section adapted to contact the exterior surface of a food product transported on said conveying means with a temperature-controlled gaseous medium flowing in a direction substantially parallel to said conveying means, said equilibrating section further comprising an equilibrating chamber defined by cabinet means having top, bottom, front, back and side walls, duct means disposed within said cabinet means communicating with the plenum means of said impingement thermal treatment section and adapted to discharge said temperature-controlled gaseous medium in a direction substantially parallel to said conveying means within said equilibrating chamber, means for controlling the flow of said temperature-controlled gaseous medium through said duct means, and curved baffle means disposed opposite to said duct means within said cabinet means, said curved baffle means being adapted to circulate the temperature-controlled gaseous medium discharged from said duct means within said equilibrating chamber.

2. The apparatus of claim 1 wherein means are provided for making the temperature-controlled gaseous medium within said equilibrating section less turbulent than the temperature-controlled gaseous medium within the impingement thermal treatment section.

3. The apparatus of claim 1, further comprising means within the equilibrating section for controlling the velocity of said temperature-controlled gaseous medium so that said velocity is less than the velocity of the temperature-controlled gaseous medium within the impingement thermal treatment section.

4. The apparatus of claim 1, further comprising a plurality of impingement thermal treatment sections and spaced-apart jet fingers within said impingement thermal treatment sections for directing a plurality of columnated jets of gas so as to impinge against the exterior surface of a food product moving relative thereto, the spacing between said jet fingers in one of said impingement thermal treatment sections being different than the spacing between said jet fingers in another impingement thermal treatment section.

* * * * *

UNITED STATES PATENT AND TRADEMARK OFFICE
CERTIFICATE OF CORRECTION

PATENT NO. : 4,479,776
DATED : October 30, 1984
INVENTOR(S) : Donald P. Smith

It is certified that error appears in the above-identified patent and that said Letters Patent is hereby corrected as shown below:

In Column 9, line 1, change "portin" to -- portion --; in Column 10, line 67, after "of equilibrating", delete -- , --; and in Column 14, line 38, change "adpated" to -- adapted --.

Signed and Sealed this

Twenty-sixth Day of March 1985

[SEAL]

Attest:

DONALD J. QUIGG

Attesting Officer    Acting Commissioner of Patents and Trademarks